US012683290B2

(12) United States Patent
Kondo et al.

(10) Patent No.: US 12,683,290 B2
(45) Date of Patent: Jul. 14, 2026

(54) RADIO WAVE ABSORBER, RADIO WAVE ABSORPTION STRUCTURE INCLUDING RADIO WAVE ABSORBER, AND COMPOSITION FOR RADIO WAVE ABSORBER

(71) Applicant: IDEMITSU KOSAN CO., LTD., Tokyo (JP)

(72) Inventors: Hirofumi Kondo, Chiyoda-ku (JP); Kotaro Kajikawa, Chiyoda-ku (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 18/864,202

(22) PCT Filed: Apr. 25, 2023

(86) PCT No.: PCT/JP2023/016226

§ 371 (c)(1),
(2) Date: Nov. 8, 2024

(87) PCT Pub. No.: WO2023/218940

PCT Pub. Date: Nov. 16, 2023

(65) Prior Publication Data

US 2025/0309557 A1 Oct. 2, 2025

(30) Foreign Application Priority Data

May 12, 2022 (JP) ................................. 2022-078919

(51) Int. Cl.
*H01Q 17/00* (2006.01)
*C08G 77/20* (2006.01)

(52) U.S. Cl.
CPC ........... *H01Q 17/008* (2013.01); *C08G 77/20* (2013.01)

(58) Field of Classification Search
CPC .......... C08G 77/04; C08K 3/04; C08K 3/046; C08K 7/02; C08K 7/22; B32B 27/283; B32B 2262/106
See application file for complete search history.

(56) References Cited

U.S. PATENT DOCUMENTS

| | | | | |
|---|---|---|---|---|
| 7,854,991 B2 * | 12/2010 | Hata | ...................... | B82Y 30/00 423/445 B |
| 11,235,560 B2 * | 2/2022 | Nagamune | .............. | C08L 21/00 |
| 2020/0287002 A1 | 9/2020 | Hosono et al. | | |

(Continued)

FOREIGN PATENT DOCUMENTS

| | | |
|---|---|---|
| CN | 108370654 A | 8/2018 |
| CN | 111279808 A | 6/2020 |

(Continued)

OTHER PUBLICATIONS

Machine-generated English-language translation of JPS63-155700-A.*

(Continued)

*Primary Examiner* — Vu A Nguyen
(74) *Attorney, Agent, or Firm* — Oblon, McClelland, Maier & Neustadt, L.L.P.

(57) ABSTRACT

A radio wave absorber comprising a resin and a carbon fiber, wherein 60 to 90% by volume of the total carbon fiber is present in a region from the first surface of the radio wave absorber to half of the total thickness of the radio wave absorber.

19 Claims, 2 Drawing Sheets

(56) References Cited

U.S. PATENT DOCUMENTS

| | | | | |
|---|---|---|---|---|
| 2021/0371623 A1 | | 12/2021 | Ueda et al. | |
| 2023/0053977 A1* | | 2/2023 | Silvi | C08K 3/041 |

FOREIGN PATENT DOCUMENTS

| | | | | | |
|---|---|---|---|---|---|
| CN | 113812043 | A | | 12/2021 | |
| EP | 0238291 | A1 | * | 9/1987 | H01Q 17/005 |
| EP | 3 972 401 | A1 | | 3/2022 | |
| JP | 60-48294 | | | 4/1985 | |
| JP | S63155700 | A | * | 6/1988 | |
| JP | 2000-151179 | | | 5/2000 | |
| JP | 2000-232297 | | | 8/2000 | |
| JP | 2004-186546 | | | 7/2004 | |
| JP | 2007-229989 | A | | 9/2007 | |
| JP | 2010-251377 | | | 11/2010 | |
| JP | 2015-23036 | | | 2/2015 | |
| JP | 2017-45946 | A | | 3/2017 | |
| JP | 2017-135189 | | | 8/2017 | |
| JP | 2019-161208 | A | | 9/2019 | |
| JP | 6 728 796 | B1 | | 7/2020 | |
| JP | 2020-111730 | A | | 7/2020 | |
| WO | WO-2013/157621 | A1 | | 10/2013 | |
| WO | WO 2019/131973 | A1 | | 7/2019 | |
| WO | WO 2021/137192 | A1 | | 7/2021 | |

OTHER PUBLICATIONS

Viton GBL200S Datasheet (Year: 2023).*

Decision to Grant a Patent issued Mar. 25, 2025, in JP2024-520365 with machine English translation.

Notice of Reasons for Refusal and Translation issued on Nov. 5, 2024, in corresponding Japanese Patent Application No. 2004-520365.

International Search Report issued Aug. 1, 2023 in PCT/JP2023/016226, 2 pages.

International Preliminary Report on Patentability and Written Opinion issued Nov. 21, 2024 in PCT/JP2023/016226, 5 pages.

Combined Chinese Office Action and Search Report issued Sep. 30, 2025 in Chinese Patent Application No. 202380039752.6, 9 pages.

Office Action dated Feb. 20, 2026, in corresponding German Patent Appin. No. 11 2023 002 223.2, citing documents 1, 2, and 3, therein.

* cited by examiner

RADIO WAVE ABSORBER, RADIO WAVE ABSORPTION STRUCTURE INCLUDING RADIO WAVE ABSORBER, AND COMPOSITION FOR RADIO WAVE ABSORBER

CROSS-REFERENCE TO RELATED APPLICATIONS

This application is a national stage application of International Application No. PCT/JP2023/016226, filed Apr. 25, 2023, which is based upon and claims the benefit of priority to Japanese Patent Application No. 2022-078919, filed May 12, 2022. The entire contents of these applications are incorporated herein by reference.

TECHNICAL FIELD

The present disclosure relates to a radio wave absorber, a radio wave absorption structure including the radio wave absorber, and a composition for a radio wave absorber.

BACKGROUND ART

In modern society, radio waves are used in various fields such as broadcasting, communication, medical treatment, chemical analyses, position measurement, and remote control. For example, millimeter-wave radars that use a radio wave with 30 to 300 GHz frequency bands are one of the key techniques for supporting the automated driving of vehicles.

The millimeter-wave radar measures a distance, a rate, and an angle with respect to an object using a radio wave with the above-mentioned frequency band. As an example of one of the applications technologies, vehicle automation, with the popularization of ADAS (Advanced Driving Assistance System), a millimeter-wave radar with a 76 to 77 GHz capable of detecting long distances is used as a forward monitoring radar. The millimeter-wave radar transmits a millimeter-wave and receives the millimeter wave reflected and returned from the object by an antenna for reception, thereby detecting the distance and the like with respect to the object.

Such a millimeter-wave radar device has a shielding member that shields radio waves between an antenna and a control circuit. The shielding member suppresses a decrease in detection accuracy due to reception of millimeter-wave reflected from a road surface or the like other than the object.

As the shielding member, Patent Documents 1 and 2 disclose a molded body and a composition containing a resin and a carbon fiber, for example.

RELATED ART DOCUMENTS

Patent Documents

[Patent Document 1] JP 2019-161208
[Patent Document 2] JP 2020-111730

SUMMARY OF THE INVENTION

Since a sensor such as a millimeter wave radar is required to be small in size and light in weight, a radio wave absorber (shielding member) as its constituent member is also required to be thinner and light in weight while maintaining high radio wave absorption characteristics.

An object of the present disclosed art is to provide a radio wave absorber that has higher radio wave absorption characteristics, and that is thinner than conventional radio wave absorbers. Another object of the present disclosure is to provide a radio wave absorption structure including the radio wave absorber, and a composition for a radio wave absorber.

As a result of intensive studies, the present inventors have found that by unevenly distributing carbon fibers on one surface side in the thickness direction of a resin as a matrix, a thin radio wave absorber having high radio wave absorption characteristics can be obtained even if the amount of carbon fibers used is reduced, and have completed the present disclosed art.

According to the present disclosed art, the following radio wave absorber and so on are provided.

1. A radio wave absorber comprising a resin and a carbon fiber,
   wherein 60 to 90% by volume of the total carbon fiber is present in a region from the first surface of the radio wave absorber to half of the total thickness of the radio wave absorber.
2. The radio wave absorber according to 1, wherein the content of the carbon fiber is 2% by volume or less of the total volume of the radio wave absorber.
3. The radio wave absorber according to 1 or 2, further comprising a hollow particle in an amount of 10% by volume or less of the total volume of the radio wave absorber.
4. The radio wave absorber according to any one of 1 to 3, wherein the carbon fiber has a mean length within a range of 100 to 4000 μm.
5. The radio wave absorber according to any one of 1 to 4, wherein the resin has an organosiloxane structure represented by the following formula (1):

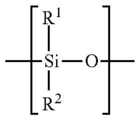

(1)

in the formula, $R^1$ and $R^2$ represent independently, a hydrogen atom, a halogen atom, an alkyl group having 1 to 6 carbon atoms, an alkoxy group having 1 to 6 carbon atoms or an aryl group having 6 to 12 carbon atoms.

6. The radio wave absorber according to any one of 1 to 5, further comprising a carbon particle in an amount of 10% by volume or less of the total volume of the radio wave absorber.
7. The radio wave absorber according to any one of 1 to 6, which absorbs radio wave over the entire frequency range of 75 GHz to 105 GHz in an amount of 30% or more.
8. A radio wave absorption structure comprising:
   the radio wave absorber according to any one of 1 to 7, and
   a radio wave reflector stacked on the first surface of the radio wave absorber.
   wherein the radio wave absorber has a thickness of 200 to 500 μm.
9. The radio wave absorption structure according to 8, which absorbs radio wave over the entire frequency range of 75 GHz to 105 GHz in an amount of 30% or more.

10. A composition for a radio wave absorber comprising a resin having an organosiloxane structure represented by the following formula (1), a carbon fiber, a hollow particle, and a carbon particle, wherein a content of the carbon fiber in the solid content in the composition is 2% by volume or less, a content of the hollow particle in the solid content in the composition is 10% by volume or less, and a content of the carbon particle in a solid content in the composition is 10% by volume or less:

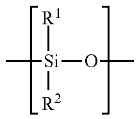

(1)

wherein in the formula, $R^1$ and $R^2$ represent independently, a hydrogen atom, a halogen atom, an alkyl group having 1 to 6 carbon atoms, an alkoxy group having 1 to 6 carbon atoms, or an aryl group having 6 to 12 carbon atoms.

According to the art of the present disclosure, it is possible to provide a thin radio wave absorber having high radio wave absorption characteristics. In addition, a radio wave absorption structure including the radio wave absorber and a composition for a radio wave absorber can be provided.

MODE FOR CARRYING OUT THE INVENTION

[Radio Wave Absorber]

A radio wave absorber according to an aspect of the present disclosed art includes a resin and a carbon fiber. Then, 60 to 90% by volume of the total carbon fiber is present in the region from the first surface to half of the total thickness of the radio wave absorber.

Figure 1:
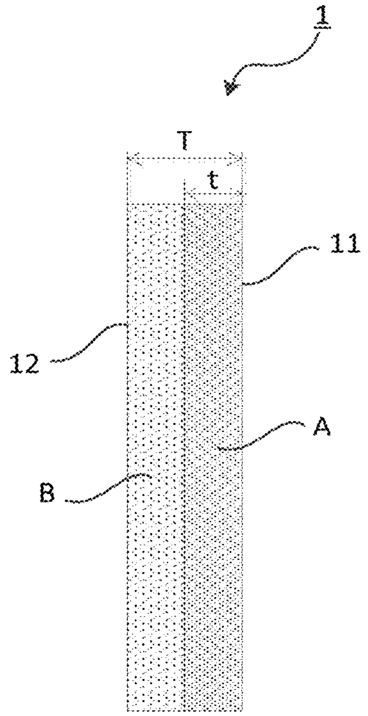
FIG. 1 is a schematic cross-sectional view of a radio wave absorber according to an aspect of the present disclosed art.

FIG. 1 is a schematic cross-sectional view of a radio wave absorber according to an aspect of the present disclosed art. The radio wave absorber 1 is a sheet including a resin and a carbon fiber and having a thickness of T. The thickness T is a distance or thickness between the first surface 11 and the second surface 12. In the radio wave absorber of the present aspect, 60 to 90% by volume of the total carbon fiber is present in a region A over from the first surface 11 to half of the total thickness T (the region A has a thickness t=0.5T). That is, the carbon fibers are lopsidedly present to the region A on the first surface 11 side than in the region B on the second surface 12 side. In the horizontal direction of the radio wave absorber (direction of the surface that receives the radio waves), the carbon fibers are evenly distributed without being sparse or dense.

By lopsidedly distributing the carbon fibers on the first surface 11 side, the radio wave absorption performance can be increased as compared with the case where the same amount of carbon fibers is uniformly dispersed in the entire radio wave absorber.

When the proportion of the carbon fibers in the region A of the radio wave absorber 1 is small, a network between the carbon fibers cannot be formed successfully, and the dielectric constant of the radio wave absorber 1 becomes low. In reverse, when the carbon fiber is precipitated and too lopsidedly distributed in the region A, the radio wave absorber 1 deviates from an appropriate dielectric constant.

The proportion (% by volume) of the carbon fibers present in the region A is determined by measuring the sample with a microfocus X-ray CT device, reconstructing 3D image with image analysis software, and three-dimensionally extracting the carbon fibers on the basis of the contrast of the image data due to the difference in the X-ray absorptance between the resin and the carbon fibers. The details are described in Examples.

The proportion of carbon fibers present in region A is preferably from 65 to 90% by volume, particularly preferably from 66 to 90% by volume, of the total volume of the carbon fibers.

Hereinafter, components and the like of the radio wave absorber will be described.

<Resin>

Examples of the resin used in the present aspect include silicone resins, epoxy resins, phenolic resins, polyurethane resins, thermosetting polyimides, unsaturated polyester resins, and alkyd resins. These resins can be used in one type alone, or can be used in combination of two or more types.

Depending on the type of resin, it is desired to use a suitable curing agent.

In one embodiment, since the dielectric constant of the radio wave absorber can be easily adjusted, a resin having an organosiloxane structure is preferable. Examples of the organosiloxane structure include a structure represented by the following formula (1):

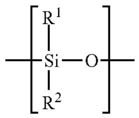

(1)

in the formula, $R^1$ and $R^2$ represent independently, a hydrogen atom, a halogen atom, an alkyl group having 1 to 6 carbon atoms, an alkoxy group having 1 to 6 carbon atoms or an aryl group having 6 to 12 carbon atoms.

In the formula (1), examples of halogen atom for $R^1$ and $R^2$ representing independently include a fluorine atom, a chlorine atom, a bromine atom, and an iodine atom. Examples of alkyl group for $R^1$ and $R^2$ representing independently include a methyl group, an ethyl group, a n-propyl group, an isopropyl group, various butyl groups ("various" means including straight-chain and all branched chain), various pentyl groups, and various hexyl groups. Examples of alkoxy group for $R^1$ and $R^2$ representing independently include the cases where its alkyl group moiety is the above-described alkyl group. Examples of aryl group for $R^1$ and $R^2$ representing independently include a phenyl group and a naphthyl group.

$R^1$ and $R^2$ are each preferably a hydrogen atom, an alkyl group having 1 to 6 carbon atoms, an alkoxy group having 1 to 6 carbon atoms, or an aryl group having 6 to 12 carbon atoms, and more preferably both methyl groups.

Examples of the resin having an organosiloxane structure include polyorganosiloxanes such as polydimethylsiloxane.

In one embodiment, the resin having an organosiloxane structure is preferably a copolymer having a structure represented by the above formula (1) and another structure. When the resin is made to be a copolymer, the viscosity at the time of production of the radio wave absorber may be easily adjusted.

Examples of the copolymer having a structure represented by the formula (1) and another structure include a polycarbonate-polyorganosiloxane copolymer.

Examples of the polycarbonate structure that the copolymer has include a structure represented by the following formula (2):

(2)

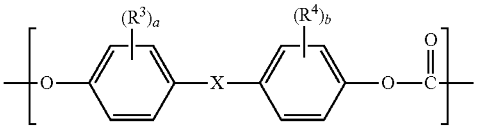

in the formula, $R^3$ and $R^4$ represent independently, a halogen atom, an alkyl group having 1 to 6 carbon atoms or an alkoxy group having 1 to 6 carbon atoms, and X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, $—SO_2—$, —O— or —CO—.

In the formula (2), examples of halogen atom for $R^3$ and $R^4$ representing independently include fluorine atom, chlorine atom, bromine atom, and iodine atom.

Examples of alkyl group for $R^3$ and $R^4$ representing independently include a methyl group, an ethyl group, a n-propyl group, an isopropyl group, various butyl groups, various pentyl groups, and various hexyl groups. Examples of alkoxy group for $R^3$ and $R^4$ representing independently include ones in the case where its alkyl group moiety is the above-mentioned alkyl group.

Examples of the alkylene groups for X representing include a methylene group, an ethylene group, a trimethylene group, a tetramethylene group, a hexamethylene group, and the like, and an alkylene group having 1 to 5 carbon atoms are preferable. Examples of the alkylidene group for X representing include an ethylidene group and an isopropylidene group. Examples of the cycloalkylene group for X representing include a cyclopentanediyl group, a cyclohexanediyl group and a cyclooctanediyl group, and a cycloalkylene group having 5 to 10 carbon atoms is preferable. Examples of the arylene group for X representing include a phenylene group, a naphthylene group, and a biphenylene group. Examples of the cycloalkylidene group for X representing include a cyclohexylidene group, a 3,5,5-trimethylcyclohexylidene group and 2-adamantylidene group, and a cycloalkylidene group having 5 to 10 carbon atoms is preferable, and a cycloalkylidene group having 5 to 8 carbon atoms is more preferable. Examples of the aryl moiety of the arylalkylene group for X representing includes aryl groups having 6 to 14 ring carbon atoms such as a phenyl group, a naphthyl group, a biphenyl group, an anthryl group, and the like. Examples of the aryl moiety of the arylalkylidene group for X representing includes aryl groups having 6 to 14 ring carbon atoms such as a phenyl group, a naphthyl group, a biphenyl group, an anthryl group, and the like.

a and b represent independently an integer of 0 to 4, preferably 0 to 2, more preferably 0 or 1. Among those structures, ones in the case where a and b are 0 and X is a single bond or an alkylene group having 1 to 8 carbon atoms, or ones in the case where a and b are 0 and X is an alkylidene group, in particular an isopropylidene group are preferable.

The details of the polycarbonate-polyorganosiloxane copolymer may be referred to WO2019/131973, for example.

<Carbon Fiber>

As the carbon fiber, any types of pitch-based carbon fiber and PAN PAN-based carbon fiber can be used. The carbon fiber may be used in one kind alone, or two or more kinds used as a mixture.

In one embodiment, the content of the carbon fiber is 2% by volume or less in the entire radio wave absorber. The radio wave absorber of the present aspect can exhibit the radio wave absorption performance efficiently with a smaller amount of the carbon fiber than in the prior art by lopsidedly distributing the carbon fibers. The content of the carbon fiber may be 1.8% by volume or less, and may be 1.5% by volume or less. The content of the carbon fiber may be 0.5% by volume or more, or 0.8% by volume or more.

The mean length of the carbon fiber is preferably from 100 μm to 4000 μm. In this range, high absorption characteristics can be obtained with a small amount of carbon fibers. The mean length of the carbon fiber may be 150 μm or more, or 200 μm or more.

Here, the mean length is the a mean value of the lengths of 25 randomly selected carbon fibers measured by scanning electrons microscopy (SEM).

Note that, the mean length is a mean value of the length of the carbon fiber (raw material) at the time of production the radio wave absorber. The mean length of the carbon fiber in the radio wave absorber as produced is also preferably within the above range.

<Optional Components>

In one embodiment, the radio wave absorber preferably contains a hollow particle. Since the density difference between the hollow particle and the carbon fiber is large, it is easy to form lopsidedly distribution of the carbon fiber in the thickness direction of the radio wave absorber by adding the hollow particle to the resin.

Examples of the hollow particle include a ceramic balloon, a glass balloon, and a shirasu balloon.

The mean diameter (d50: median diameter) of the hollow particle is preferably ½ or less of the mean length of the carbon fiber. More preferably, the mean length of the hollow particle is ⅓ or less of the carbon fiber. The mean diameter of the hollow particle is a value determined on the basis of JIS Z 8819-1:1999.

The pressure resistance strength of the hollow particle is preferably equal to or greater than 8 MPa. This is because when the pressure resistance of the hollow particle is low, cracks are likely to occur to the hollow particle at the time of mixing with the resin or the other timing. The pressure resistance strength of the hollow particle is more preferably equal to or greater than 10 MPa.

The pressure resistance strength is measured by a glycerol method in accordance with ASTM D3102-78.

The content of the hollow particle in the entire radio wave absorber may be 1% by volume or more, and may be 2% by volume or more. Further, it may be 10% by volume or less, and may be 8% by volume or less.

In one embodiment, the radio wave absorber preferably contains carbon particle. By containing the carbon particle, it is possible to obtain an appropriate conduction loss, and it is possible to convert a radio wave into heat, so that a radio wave absorption performance can be obtained.

Examples of the carbon particle include acetylene black, furnace black, and channel black.

The content of the carbon particle with respect to the entire radio wave absorber may be 0.1% by volume or more, and may be 0.2% by volume or more. Further, it may be 10% by volume or less, 5% by volume or less, and 3% by volume or less.

The radio wave absorber of the present aspect may contain known resin additives as long as the problem of the present disclosed art can be solved. Examples of the known resin additives include stabilizers against heat, light, ultraviolet rays and the like, lubricants, nucleating agents, plasticizers, antistatic agents, mold release agents, flame retardants, softeners, dispersants, antioxidants, colorants, and the like.

The total content of the known resin additives is preferably equal to or less than 50% by mass, and more preferably equal to or less than 40% by mass of the electromagnetic wave absorber.

<Production of Radio Wave Absorber>

The radio wave absorber of the present aspect can be produced, for example, by mixing the above-described resin, carbon fiber, and optional components as needed, followed by formation of the mixture into a sheet-like shape. For mixing, a known dispersing device such as a high speed disperser, a sand grind mill, a basket mill, a three-roll mill, or a ball mill may be used as necessary.

At the time of mixing, each of the components may be mixed at once or in portions so as to have a predetermined amount. At the time of mixing, order of addition of the components is not particularly limited.

As one example of production of the radio wave absorber of the present aspect, a method in which the above-described components are mixed with a solution formed of a thermosetting resin (a liquid body before curing) or a resin dissolved in a solvent, and the resultant mixed liquid is formed into a sheet shape having a desired thickness by cast film formation, applicator film formation, or the like, followed by heating, may be exemplified. In this method, lopsided distribution of the carbon fiber can be adjusted by time of leaving the mixed liquid to stand before heating. The leaving time and the heating time of the mixed liquid can be appropriately adjusted in consideration of the viscosity of the resin or the resin solution used, kind of the solvent used, and the like.

The concentration of the solid content in the mixed liquid can be determined so as to obtain an appropriate film thickness with respect to a frequency at which the maximum absorption performance of the radio wave absorber is obtained, and is preferably 80% by mass or less and 5% by mass or more.

In the present aspect, the thickness of the radio wave absorber (T in FIG. 1) is preferably 200 to 500 μm. According to the present embodiment, by lopsidedly distributing carbon fibers, the radio wave absorption performance can be efficiently exhibited with a smaller amount of the carbon fiber than that in the prior art. Therefore, the thickness of the radio wave absorber can be made thinner than that in the prior art. The thickness may be 400 μm or less, or 350 μm or less.

[Radio Wave Absorption Structure]

A radio wave absorption structure according to an aspect of the present disclosed art includes the above-described radio wave absorber of the present disclosure, and a radio wave reflector stacked on the surface side of the radio wave absorber in which the carbon fiber is lopsidedly distributed.

Figure 2:
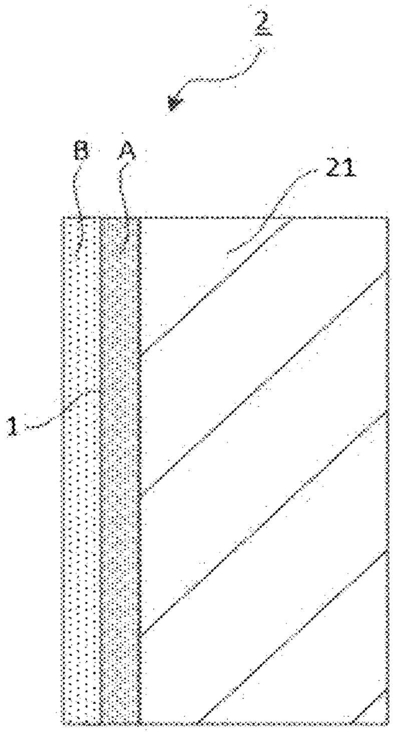
FIG. 2 is a schematic cross-sectional view of a radio wave absorption structure according to an aspect of the present disclosed art.

FIG. 2 is a schematic cross-sectional view of a radio wave absorption structure according to an aspect of the present disclosed art. The radio wave absorption structure 2 has a structure formed by stacking the radio wave absorber 1 on one surface of the radio wave reflector 21. At this time, on the region A side where the carbon fiber is lopsidedly distributed, the radio wave reflector 21 is stacked. As a result, the radio wave absorption performance can be improved as compared with the case where the same amount of the carbon fiber is uniformly dispersed in the radio wave absorber.

The radio wave reflector is not particularly limited as long as it has a property of reflecting radio waves without transmitting them, such as a metal plate, a metal foil, or a metal film. Note that, a resin layer such as a common adhesive layer may be formed between the radio wave absorber and the radio wave reflector.

The radio wave absorption structure can be produced, for example, by a method for directly forming the radio wave absorber 1 on the radio wave reflector 21, or by attaching the radio wave reflector 21 to the radio wave absorber 1.

Although the sheet-like radio wave absorption structure is illustrated in FIG. 2, the radio wave absorption structure of the present aspect is not limited to a planar body such as a sheet, and can be appropriately molded dependent upon a site to be applied.

The radio wave absorber and the radio wave absorption structure of the present disclosure have high-level radio wave absorption performance over the entire frequency range of 75 GHz to 105 GHz. Specifically, the absorption amount of radio waves over the entire frequency range of 75 GHz to 105 GHz can be set to 30% or more.

In particular, in the frequency domain (75 to 80 GHz) of a millimeter-wave radar capable of detecting a long distance, the radio wave absorption amount can be set to 30% or more, 50% or more, or 60% or more.

[Composition for Radio Wave Absorber]

The composition for a radio wave absorber of the present disclosure includes a resin having an organosiloxane structure represented by the following formula (1), a carbon fiber, a hollow particle, and a carbon particle. And, the content of the carbon fiber in the solid content in the composition is 2% by volume or less, the content of the hollow particle in the solid content in the composition is 10% by volume or less, and the content of the carbon particle in the solid content in the composition is 10% by volume or less.

(1)

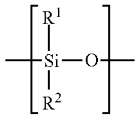

In the formula, $R^1$ and $R^2$ represent independently, a hydrogen atom, a halogen atom, an alkyl group having 1 to 6 carbon atoms, an alkoxy group having 1 to 6 carbon atoms or an aryl group having 6 to 12 carbon atoms.

Specific constituent components, composition, preferred examples thereof, and the like of the composition for a radio wave absorber of the present aspect are the same as those of the above-described radio wave absorber. The composition for the radio wave absorber of the present aspect may contain a known additive for resin to the extent that the problem of the present disclosed art can be solved.

The composition for the radio wave absorber of the present aspect may further contain a solvent. When the composition contains a solvent, the concentration of the solid content in the composition is preferably 80% by mass or less, and preferably 5% by mass or more. The solvent is not particularly limited, and examples thereof include N-methyl-2-pyrrolidone (NMP), dimethylformamide (DMF), cyclopentylmethylether (CPME), and mixed solvents thereof.

EXAMPLES

Hereinafter, the present disclosed art is described in more detail based on Examples, but the present disclosed art is not limited to these Examples.

It should be noted that, operations described below, in which the temperature condition and the pressure condition are not particularly described, were performed at room temperature (usually 25° C.) for the temperature condition, and at normal pressure (usually 0.1013 MPa) for the pressure condition.

Example 1

98.9% by volume (after curing) of a silicone resin (polydimethylsiloxane: main material; Silpot184 (registered trademark) manufactured by Dow-Toray Co., Ltd.) and 1.1% by volume of a carbon fiber (middle fiber, manufactured by Nippon Graphite Fiber Co., Ltd., XN-100-25M, mean length: 250 μm) were mixed and stirred at a 2000 rpm for 2 minutes using a rotating revolving formula mixer (Awatori Neritaro ARE-310).

To the obtained mixed liquid, 1 (volume ratio) of a curing agent of Silpot184 (registered trademark) was added to 10 of the main material, and the mixture was further mixed and stirred at a 2000 rpm for 2 minutes, followed by defoaming at a 2000 rpm for 2 minutes.

The defoamed mixed liquid was poured into an aluminum container having a size of 10 cm square and allowed to stand for 50 minutes. Then, the aluminum container was heated at 100° C. for 40 minutes on a hot plate to cure the mixture, and the cured product (cast film) was peeled from the aluminum container to prepare a radio wave absorber.

In Example 1, the carbon fiber was lopsidedly distributed to the lower portion of the cast film by allowing the mixture mixed liquid to stand for 50 minutes.

Example 2

A radio wave absorption structure was prepared in the same manner as in Example 1, except that the composition of the mixed liquid was changed as shown in Table 1, and the cured product (cast film) was not peeled off from the aluminum container to obtain a stacked body composed of the aluminum and the cured product.

Example 3 to 6

Radio wave absorbers were prepared in the same manner as in Example 1, except that the compositions of the mixed liquid were changed as shown in Table 1. In Examples 3, 5, and 6, cured products were not peeled off from the aluminum container as in Example 2 and to obtain radio wave absorption structures constituted of stacked bodiesy composed of the aluminum and the cured product.

Examples 7 to 11

To a mixed solvent of N-methyl-2-pyrrolidone (NMP), dimethylformamide (DMF) and cyclopentyl methyl ether (CPME) (NMP:DMF:CPME=10.3:3.5:1.0/weight ratio), the components were added with the respective volume ratios (excluding the mixed solvent) shown in Tables 1 and 2, mixed and stirred to obtain mixed liquids.

The mixed liquids were respectively poured into an aluminum container having a size of 10 cm square and allowed to stand for 20 minutes. Then, the aluminum container was heated at 140° C. for 60 minutes on a hot plate, and the mixed liquid was evaporated to dryness, thereby prepare radio wave absorbers as a cured product (cast film).

In Examples 7 to 11, the carbon fiber could be lopsidedly distributed in the lower portion of the cured product by allowing the mixed liquid to stand for 20 minutes, which was a shorter time than in Example 1.

In Example 9, the radio wave absorber was stacked on an aluminum plate serving as a radio wave reflector to produce a radio wave absorption structure.

Comparative Example 1

Each of components were added at the volume ratios shown in Table 1, and a mixture was prepared in the same manner as in Example 1. The mixed liquid was poured into an aluminum container having a size of 10 cm square, and the aluminum container was heated on a hot plate at 100° C. for 40 minutes without being allowed to stand, the mixed liquid was cured, and the cured product (cast film) was peeled from the aluminum container to produce a radio wave absorber.

COMPARATIVE EXAMPLE 2 TO 5

Radio wave absorbers were prepared in the same manner as in Comparative Example 1, except that the compositions of the mixed liquid were respectively changed as shown in Table 1.

Comparative Example 6

To a mixed solvent of N-methyl-2-pyrrolidone (NMP), dimethylformamide (DMF) and cyclopentyl methyl ether (CPME) (NMP:DMF:CPME=10.3:3.5:1.0/weight ratio), the respective components were added with a volume ratio (excluding the mixed solvent) shown in Table 2, and mixed and stirred to obtain a mixed liquid.

The mixed liquid was poured into an aluminum container having a size of 10 cm square and allowed to stand for 60 minutes. Then, the aluminum container was heated at 140° C. for 60 minutes on a hot plate, the mixed liquid was cured, and the cured product (cast film) was peeled from the aluminum container to produce a radio wave absorber.

Regarding the radio wave absorbers and the radio wave absorption structures produced in Examples and Comparative Examples, the ratio of carbon fibers contained in the lower 50% region from the bottom (region A in FIG. 1) of the radio wave absorber and the radio wave absorption characteristics were measured.

<Method for Measuring Ratio of Carbon Fiber Contained in Lower 50% Region of Radio Wave Absorber>

The radio wave absorber was cut into a size of 8 mm×20 mm square and used as a sample. For the sample, measurement was conducted using a microfocus X-ray CT device (SkyScan2211, manufactured by Bruker), and then a 3D image was reconstructed by using an image analysis software (manufactured by Ratoc System Engineering Co., Ltd., TRI/3D-VIE), and the carbon fiber was three-dimensionally extracted on the basis of the contrast of the image data due to the difference in the X-ray absorptivity between the resin and the additive (carbon fiber). The volume density (vol %) of the carbon fiber was calculated by analyzing the fiber length distribution of the extracted carbon-fiber and converting it into volume.

<Radio Wave Absorption Characteristics>

The measurement of the radio wave absorption characteristics was carried out by the free space method.

Equipment used: PNA Microwave Network Analyzer N5227 (Keysight Technologies)

Test conditions

Atmosphere: in the air

Temperature: room temperature

Frequency: 75 GHz to 105 GHz (Table 1)

Irradiation angle: vertical direction

Measurement results are shown in Table 1 and Table 2.

TABLE 1

| | | Examples | | | | | | | | | Comparative Examples | | | | |
|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 |
| Resin (vol %) | PDMS | 98.9 | 99.1 | 92.7 | 90.41 | 91.83 | 96.04 | 0 | 0 | 0 | 98.9 | 100 | 90.4 | 99.0 | 92.1 |
| | Resin A | 0 | 0 | 0 | 0 | 0 | 0 | 97.5 | 97.63 | 97.13 | 0 | 0 | 0 | 0 | 0 |
| Carbon fiber (vol %) | Mean length: 150 μm | 0 | 0 | 0 | 0 | 0 | 0 | 0 | 0 | 1.57 | 0 | 0 | 0 | 1.0 | 0 |
| | Mean length: 250 μm | 1.1 | 0.9 | 1.2 | 0 | 1.17 | 1.16 | 1.37 | 1.49 | 0 | 1.1 | 0 | 0 | 0 | 0 |
| | Mean length: 3000 μm | 0 | 0 | 0 | 1.89 | 0 | 0 | 0 | 0 | 0 | 0 | 0 | 0 | 0 | 0 |
| Hollow particle (vol %) | | 0 | 0 | 6.1 | 7.7 | 7 | 2.8 | 0 | 0 | 0 | 0 | 0 | 0 | 0 | 7.9 |
| Acetylene black (vol %) | | 0 | 0 | 0 | 0 | 0 | 0 | 1.13 | 0.88 | 1.3 | 0 | 0 | 9.6 | 0 | 0 |
| Radio wave reflector | | Absence | Presence | Presence | Absence | Presence | Presence | Absence | Absence | Presence | Absence | Absence | Absence | Absence | Absence |
| Thickness of radio wave absorber (μm) | | 305 | 286 | 315 | 247 | 320 | 320 | 305 | 316 | 306 | 305 | 290 | 328 | 443 | 307 |
| Ratio of carbon fiber contained in lower region of Radio wave absorber (vol %) | | 63 | 62 | 69 | 78 | 71 | 66 | 88 | 85 | 86 | 51 | — | — | 52 | — |
| Amount of radio wave absorption (%) | 75 GHz | 31.8 | 36.1 | 99.8 | 67.6 | 97.9 | 97.1 | 56.7 | 68.0 | 93.8 | 15.9 | 4.0 | 13.0 | 9.7 | 4.7 |
| | 80 GHz | 33.3 | 48.9 | 97.1 | 66.3 | 98.9 | 98.0 | 60.9 | 74.2 | 98.3 | 16.6 | 3.7 | 12.1 | 9.3 | 4.3 |
| | 85 GHz | 36.1 | 68.0 | 92.1 | 67.0 | 96.6 | 95.5 | 66.9 | 80.6 | 99.1 | 18.8 | 3.1 | 11.4 | 9.7 | 3.2 |
| | 90 GHz | 39.7 | 85.2 | 88.0 | 67.4 | 93.7 | 91.2 | 73.2 | 85.3 | 97.4 | 21.2 | 3.4 | 11.9 | 11.4 | 3.5 |
| | 95 GHz | 43.9 | 95.1 | 85.5 | 68.6 | 90.3 | 87.7 | 79.6 | 88.5 | 94.9 | 23.8 | 4.4 | 12.8 | 13.6 | 4.4 |
| | 100 GHz | 48.2 | 98.7 | 83.7 | 69.3 | 87.1 | 85.2 | 85.1 | 90.0 | 92.4 | 26.0 | 4.2 | 13.0 | 16.1 | 4.2 |
| | 105 GHz | 52.6 | 99.9 | 81.7 | 69.0 | 84.8 | 83.7 | 88.3 | 89.9 | 90.2 | 28.2 | 3.4 | 12.4 | 18.5 | 3.7 |

TABLE 2

| | | Example | | Comparative Example |
|---|---|---|---|---|
| | | 10 | 11 | 6 |
| Rasin (vol %) | PDMS | 95.4 | 0 | 0 |
| | Rasin A | 0 | 0 | 97.57 |
| | Rasin B | 0 | 97.8 | 0 |
| Carbon fiber (vol %) | Mean length: 150 μm | 0.6 | 1.0 | 0 |
| | Mean length: 250 μm | 0 | 0.93 | 1.42 |

TABLE 2-continued

| | | Example | | Comparative Example |
|---|---|---|---|---|
| | | 10 | 11 | 6 |
| | Mean length: 3000 μm | 0 | 0 | 0 |
| Hollow particle (vol %) | | 0 | 0 | 0 |
| Acetylene black (vol %) | | 4 | 0.27 | 1.01 |
| Radio wave reflector | | Presence | Presence | Absence |
| Thickness of radio wave absorber (μm) | | 441 | 305 | 283 |
| Ratio of carbon fiber contained in lower region of Radio wave absorber (vol %) | | 65 | 81 | 100 |
| Amount of radio wave absorption (%) | 75 GHz | 51.6 | 98.8 | 24.4 |
| | 80 GHz | 47.4 | 99.5 | 25.2 |
| | 85 GHz | 45.2 | 95.8 | 27.0 |
| | 90 GHz | 44.6 | 91.8 | 29.0 |
| | 95 GHz | 45.3 | 89.7 | 32.0 |
| | 100 GHz | 47.0 | 86.3 | 34.4 |
| | 105 GHz | 49.4 | 81.7 | 37.2 |

Materials used are as follows.

(Resin)

PDMS: Silicone resin (polydimethylsiloxane: manufactured by Dow Toray Co., Ltd., Silpot184®

Resin A: Polycarbonate-Polyorganosiloxane copolymer prepared in Production Example 2 described later Resin B: Polycarbonate-Polyorganosiloxane copolymer prepared in Production Example 3 described later (Carbon Fiber)

Middle fiber (manufactured by Nippon Graphite Fiber Co., Ltd.)

Mean length of 150 μm (XN-100-15M)

Mean length of 250 μm (XN-100-25M)

Mean length of 3000 μm (XN-100-03Z)

(Hollow Particles)

Hollow glass beads (Q-CEL 7040S manufactured by Potters-Ballotini Co., Ltd.)

(Radio Wave Reflector)

Aluminum plate (a size of 10 cm square, and 2 mm in thickness)

(Others)

Carbon particles (Acetylene Black, manufactured by Denka Co., Ltd., Denka Black (100% press))

From Table 1 and Table 2, it can be confirmed that Examples have a high absorption characteristic of 30% or more in the absorption characteristic amount at the entire frequencies range. On the other hand, although Comparative Example 1 was composed of the same components as in Example 1, the amount of radio wave absorption was less than 30% at the entire frequency range. This is considered that the proportion of the carbon fiber in the lower region of the radio wave absorber is as low as 51% by volume, so that the network between the carbon fibers cannot be formed successfully, and the dielectric constant of the radio wave absorber becomes low.

Figure 3:
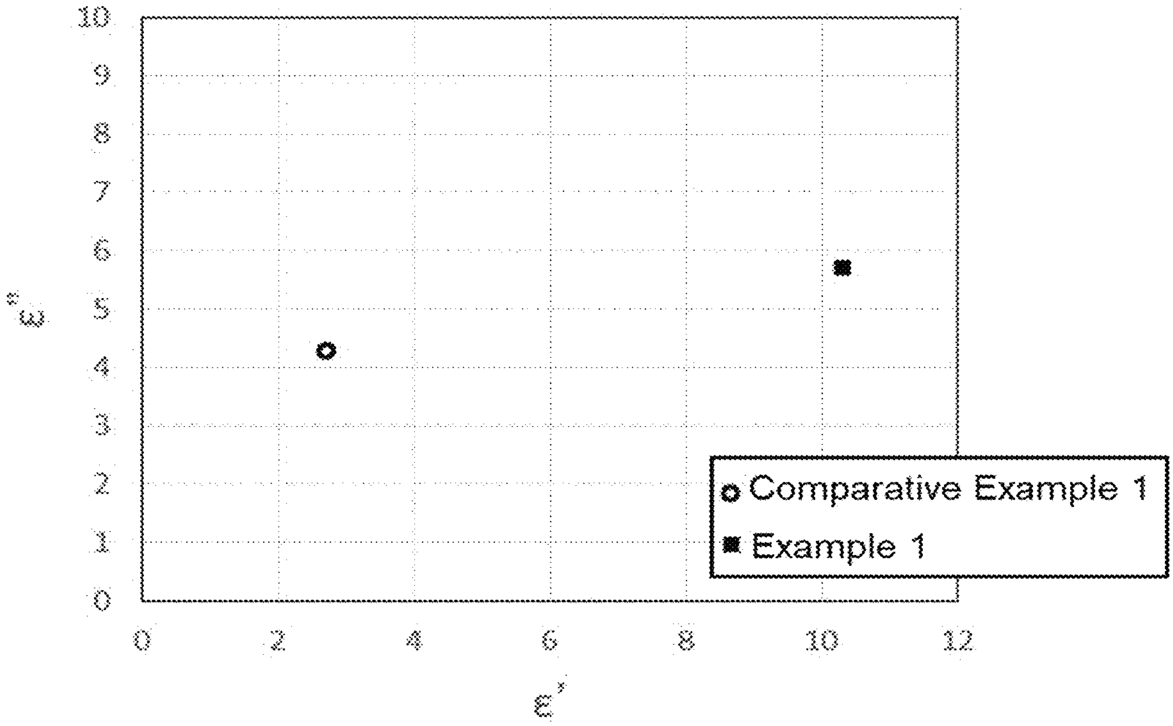
FIG. 3 is a diagram showing the difference in the complex dielectric constant between the radio wave absorbers produced in Example 1 and Comparative Example 1.

FIG. 3 shows complex dielectric constants (@76 GHz) of the radio wave absorbers produced in Example 1 and Comparative Example 1. Thus, it can be confirmed that they are greatly different in the complex dielectric constant.

The radio wave absorbers produced in Comparative Examples 2, 3, and 5 did not contain the carbon fiber, so that the amount of radio wave absorption was less than 30% at the entire frequency range.

Since the radio wave absorber produced in Comparative Example 4 has a proportion of the carbon fiber in the lower region thereof as low as 52% by volume, it is considered that the network between the carbon fibers cannot be formed successfully, and the dielectric constant of the radio wave absorber became low.

In Comparative Example 6, as a result of measuring the radio wave absorption characteristics, the amount of the radio wave absorption did not become 30% or more at the entire frequency range. It is considered that it is the reason for the dielectric constant of the radio wave absorber deviated from an appropriate range that the time for leaving to stand of the carbon fiber was long, so that the carbon fiber was settled to too lopsidedly distributing to the first surface side.

[Production of Resins A and B (Polycarbonate-Polyorganosiloxane Copolymer)]

Production Example 1

(Production of Polycarbonate Oligomers)

To 5.6% by mass of a sodium hydroxide aqueous solution, 2000 ppm by mass of sodium dithionite with respect to the amount of the bisphenol A (BPA) to be dissolved later, was added. Next, BPA was dissolved in the above-mentioned aqueous solution so as to have a content of 13.5% by mass, to prepare a sodium hydroxide aqueous solution of BPA was prepared.

The resulting sodium hydroxide aqueous solution of BPA at the flow rate of 40 L/hr, chlorinated methylene at the flow rate of 15 L/hr, and phosgene at the flow rate of 4.0 kg/hr were continuously introduced into a tubular reactor having an inner diameter of 6 mm and a tube length of 30 m. The tubular reactor had a jacket portion, and the temperature of the reaction liquid was maintained at 40° C. or lower by passing cooling water through the jacket.

The reaction liquid passed through the tubular reactor was continuously introduced into a vessel-type reactor having an inner volume of 40 L equipped with a baffle and a sweep-back blade. The sodium hydroxide aqueous solution of BPA at the flow rate of 2.8 L/hr, 25% by mass of a sodium hydroxide aqueous solution at the flow rate of 0.07 L/hr, water at the flow rate of 17 L/hr, and 1% by mass of a triethylamine aqueous solution at the flow rate of 0.64 L/hr were introduced and reacted in the vessel-type reactor.

The reaction liquid spilling out of the vessel-type reactor was continuously extracted, the aqueous phase of the extracted reaction liquid was separated off by standing, and the methylene chloride phase was collected to obtain a polycarbonate oligomer solution. The concentration of the polycarbonate oligomer was 341 g/L and the concentration of its chloroformate groups was 0.71 mol/L.

Production Example 2

(Production of Resin A)

A 1L separable flask equipped with a baffle plate and a mechanical stirrer with a stirring blade was charged with 185 mL of the polycarbonate oligomer solution (PCO) prepared in Production Example 1, 445 mL of methylene chloride, 55 g of allylphenol-terminal modified polydimethylsiloxane having an average chain length n of 37, and 0.104 mL (0.75 mmol) of triethylamine (TEA). Under stirring, s sodium hydroxide aqueous solution A (an aqueous solution prepared by dissolving 1.0 g (26.2 mmol) of NaOH in 12 mL ion-exchanged water) was added thereto and polymerized for 20 minutes.

To the obtained polymerization liquid, 9.8 g of a solution of p-tert-butylphenol (PTBP: manufactured by DIC Corporation) in methylene chloride [a solution of 1.8 g (12.1 mmol) of PTBP dissolved in 6 mL of methylene chloride] and a sodium hydroxide aqueous solution C (a solution of 9.3 g (32.0 mmol) of bisphenol A, 6.8 g (170.5 mmol) of NaOH and 0.031 g (0.20 mmol) of $Na_2S_2O_4$ dissolved in 100 mL of ion-exchanged water) were added, and polymerization was carried out for 20 minutes.

After completion of the polymerization, the polymerization liquid was transferred to a separatory funnel and allowed to stand, and separated into an organic phase and an aqueous phase. The organic phase was transferred to another separatory funnel and washed sequentially with 100 mL of a 0.03 mol/L NaOH aqueous solution and 100 ml of 0.2 mol/L hydrochloric acid. Then, washing with ion-exchanged water was repeatedly conducted until the electrical conductivity of the aqueous phase after washing became 10 μS/m or lower.

The washed organic phase was transferred to a batt, dried in an explosion-proof dryer (under nitrogen atmosphere) at 48° C. overnight to form a sheet, and the sheet was cut to obtain a flaky PC-POS copolymer (Resin A).

Production Example 3

(Production of Resin B)

A 1 L separable flask equipped with a baffle plate and a mechanical stirrer with a stirrer blade was charged with 185 mL of the polycarbonate oligomer solution (PCO) prepared in Production Example 1, 445 mL of methylene chloride, 77 g of allylphenol-terminal modified polydimethylsiloxane having an average chain length n of 37, and 0.104 mL (0.75 mmol) of triethylamine (TEA). Under stirring, a sodium hydroxide aqueous solution A (an aqueous solution of 2.1 g (52.5 mmol) of NaOH dissolved in 24 mL of ion-exchanged water) was added thereto, and the polycarbonate oligomer and allylphenol-terminal modified PDMS were polymerized for 20 minutes.

To the obtained polymerization solution, a solution of p-tert-butylphenol (PTBP: manufactured by DIC Corporation) dissp;ved in methylene chloride [a solution prepared by dissolving 1.8 g (12.0 mmol) of PTBP in 10 mL of methylene chloride] and a sodium hydroxide aqueous solution C (a solution prepared by dissolving 7.6 g (33.4 mmol) of bisphenol A, 5.8 g (144.3 mmol) of NaOH and 0.015 g (0.1 mmol) of $Na_2S_2O_4$ in 84 mL of ion-exchanged water) were added, and polymerization was carried out for 20 minutes.

After completion of the polymerization, the reaction liquid was transferred to a separatory funnel and allowed to stand, and separated into an organic phase and an aqueous phase. The organic layer was transferred to another separatory funnel and washed sequentially with 100 ml of a 0.03 mol/L NaOH aqueous solution and 100 ml of 0.2 mol/L hydrochloric acid. Then, washing with ion-exchanged water was repeatedly conducted until the electrical conductivity of the aqueous phase after washing became 10 μS/m or lower.

The washed organic layer was transferred to a batt, and dried in an explosion-proof dryer (under nitrogen atmosphere) at 48° C. overnight to form a sheet, and the sheet was cut to obtain a flaky PC-POS copolymer (resin-B).

INDUSTRIAL APPLICABILITY

The radio wave absorber of the present disclosure can be used in vehicles, civil engineering structures, buildings, harbor facilities, ship facilities, bridges, power facilities, communication facilities, mechanical facilities, and the like as a member that absorbs radio waves in the millimeter wave range. Specifically, the radio wave absorber of the present disclosure is suitable as a millimeter-wave radar apparatus used in ships, airplanes, vehicles and the like, and a radio wave absorbing and shielding member used in an electric and electronic apparatus, and the like. Further, the radio wave absorber of the present disclosure is suitable as a member that absorbs and shields unnecessary radio wave in a traffic infrastructure environment such as a guardrail of a road, an inner wall of a tunnel, or a smart city.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A radio wave absorber, comprising:

a resin; and a carbon fiber selected from a pitch-based carbon fiber and a PAN-based carbon fiber, wherein 60 to 90% by volume of the total carbon fiber is present in a region from the first surface of the radio wave absorber to half of the total thickness of the radio wave absorber.

2. The radio wave absorber according to claim 1, wherein the content of the carbon fiber is 2% by volume or less of the total volume of the radio wave absorber.

3. The radio wave absorber according to claim 1, further comprising:

a hollow particle in an amount of 10% by volume or less of the total volume of the radio wave absorber.

4. The radio wave absorber according to claim 1, wherein the carbon fiber has a mean length within a range of 100 to 4000 μm.

5. The radio wave absorber according to claim 1, wherein the resin has an organosiloxane structure represented by the following formula (1):

(1)

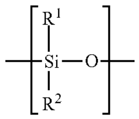

in the formula, $R^1$ and $R^2$ represent independently, a hydrogen atom, a halogen atom, an alkyl group having 1 to 6 carbon atoms, an alkoxy group having 1 to 6 carbon atoms, or an aryl group having 6 to 12 carbon atoms.

6. The radio wave absorber according to claim 1, further comprising:

a carbon particle in an amount of 10% by volume or less of the total volume of the radio wave absorber.

7. The radio wave absorber according to claim 1, which absorbs radio wave over the entire frequency range of 75 GHz to 105 GHz in an amount of 30% or more.

8. A radio wave absorption structure, comprising:

the radio wave absorber of claim 1, and a radio wave reflector stacked on the surface side of the radio wave absorber in which the carbon fiber is lopsidedly distributed, wherein the radio wave absorber has a thickness of 200 to 500 μm.

9. The radio wave absorption structure according to claim 8, which absorbs radio wave over the entire frequency range of 75 GHz to 105 GHz in an amount of 30% or more.

10. The radio wave absorber according to claim 2, further comprising:

a hollow particle in an amount of 10% by volume or less of the total volume of the radio wave absorber.

11. The radio wave absorber according to claim 2, wherein the carbon fiber has a mean length within a range of 100 to 4000 μm.

12. The radio wave absorber according to claim 2, wherein the resin has an organosiloxane structure represented by the following formula (1):

(1)

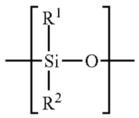

in the formula, $R^1$ and $R^2$ represent independently, a hydrogen atom, a halogen atom, an alkyl group having 1 to 6 carbon atoms, an alkoxy group having 1 to 6 carbon atoms, or an aryl group having 6 to 12 carbon atoms.

13. The radio wave absorber according to claim 2, further comprising:

a carbon particle in an amount of 10% by volume or less of the total volume of the radio wave absorber.

14. The radio wave absorber according to claim 2, which absorbs radio wave over the entire frequency range of 75 GHz to 105 GHz in an amount of 30% or more.

15. The radio wave absorber according to claim 3, wherein the carbon fiber has a mean length within a range of 100 to 4000 μm.

16. The radio wave absorber according to claim 3, wherein the resin has an organosiloxane structure represented by the following formula (1):

(1)

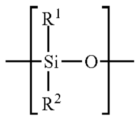

in the formula, $R^1$ and $R^2$ represent independently, a hydrogen atom, a halogen atom, an alkyl group having 1 to 6 carbon atoms, an alkoxy group having 1 to 6 carbon atoms, or an aryl group having 6 to 12 carbon atoms.

17. The radio wave absorber according to claim 3, further comprising:

a carbon particle in an amount of 10% by volume or less of the total volume of the radio wave absorber.

18. The radio wave absorber according to claim 3, which absorbs radio wave over the entire frequency range of 75 GHz to 105 GHz in an amount of 30% or more.

19. The radio wave absorber according to claim 4, wherein the resin has an organosiloxane structure represented by the following formula (1):

(1)

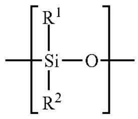

in the formula, $R^1$ and $R^2$ represent independently, a hydrogen atom, a halogen atom, an alkyl group having 1 to 6 carbon atoms, an alkoxy group having 1 to 6 carbon atoms, or an aryl group having 6 to 12 carbon atoms.

* * * * *